Aug. 24, 1965 W. A. SCHAICH 3,201,846
APPARATUS FOR SUPPORTING A REINFORCING MESH IN A MOLD
Filed May 31, 1961 4 Sheets-Sheet 1
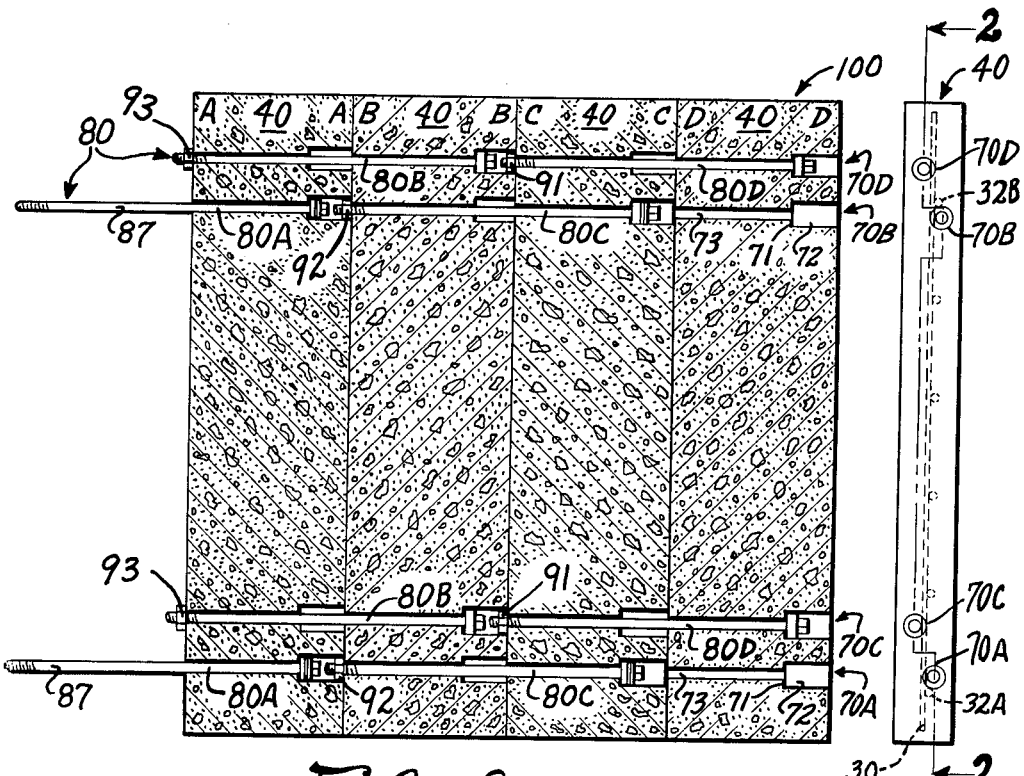
FIG. 2.
FIG. 1.
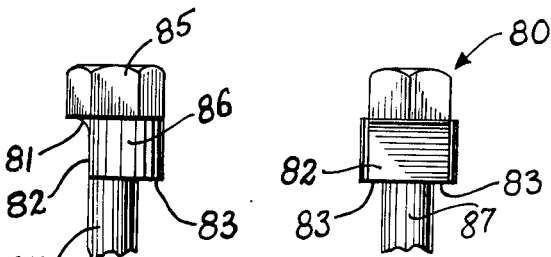
FIG. 6.
FIG. 7.
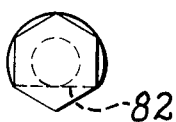
FIG. 8.
INVENTOR.
WILBUR A. SCHAICH
BY
J. F. TEIGLAND and
W. A. SCHAICH
ATTORNEYS

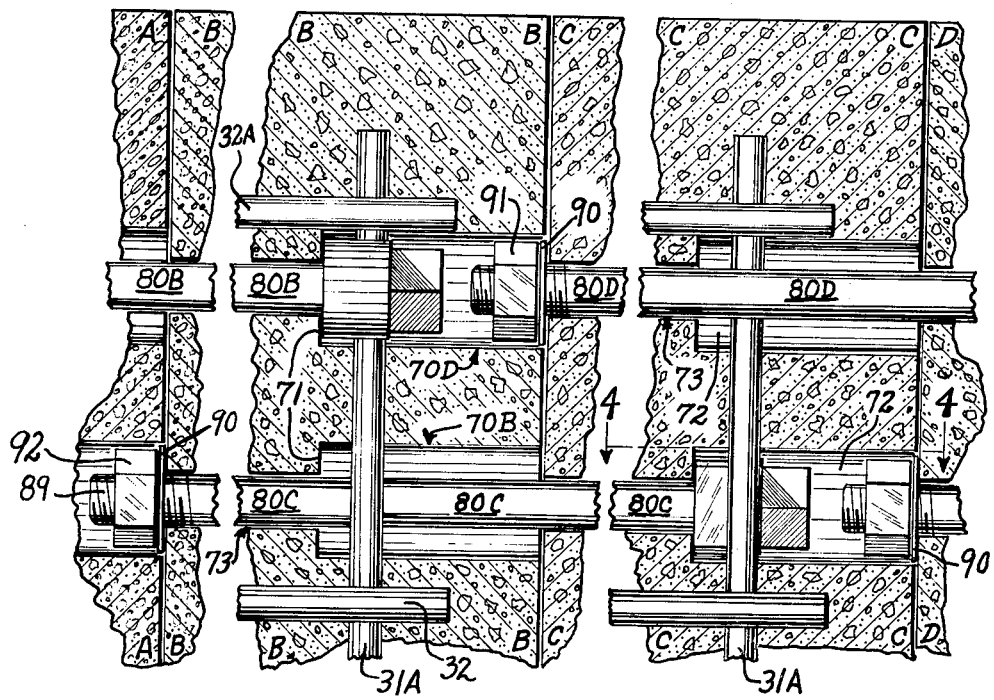
FIG. 3.
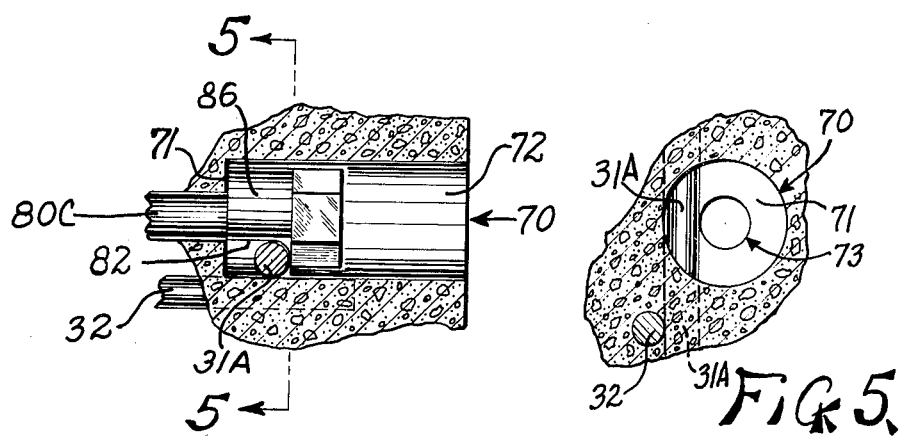
FIG. 4.
FIG. 5.
INVENTOR.
WILBUR A. SCHAICH
BY
J. F. TEIGLAND and
W. A. SCHAICH
ATTORNEYS

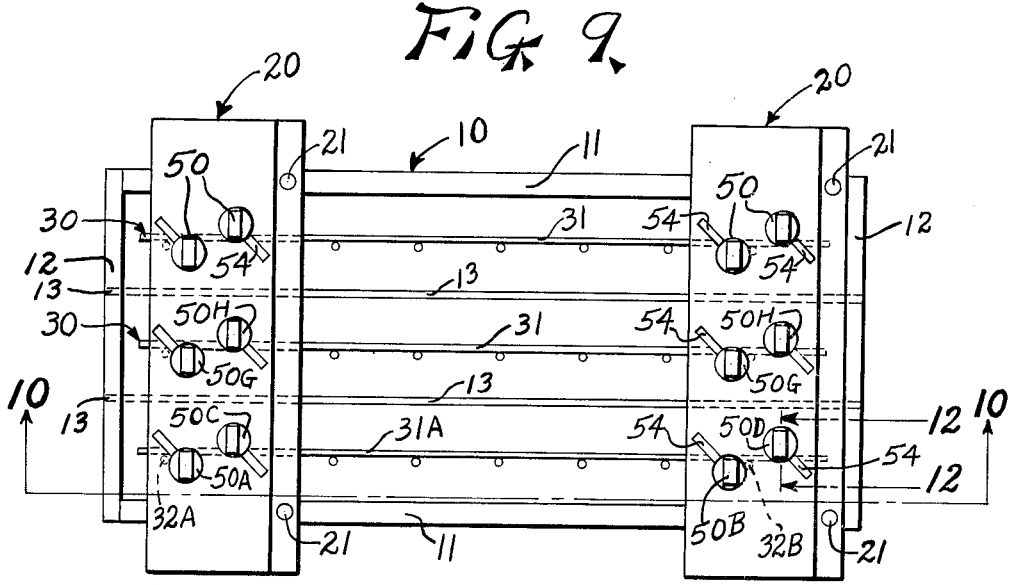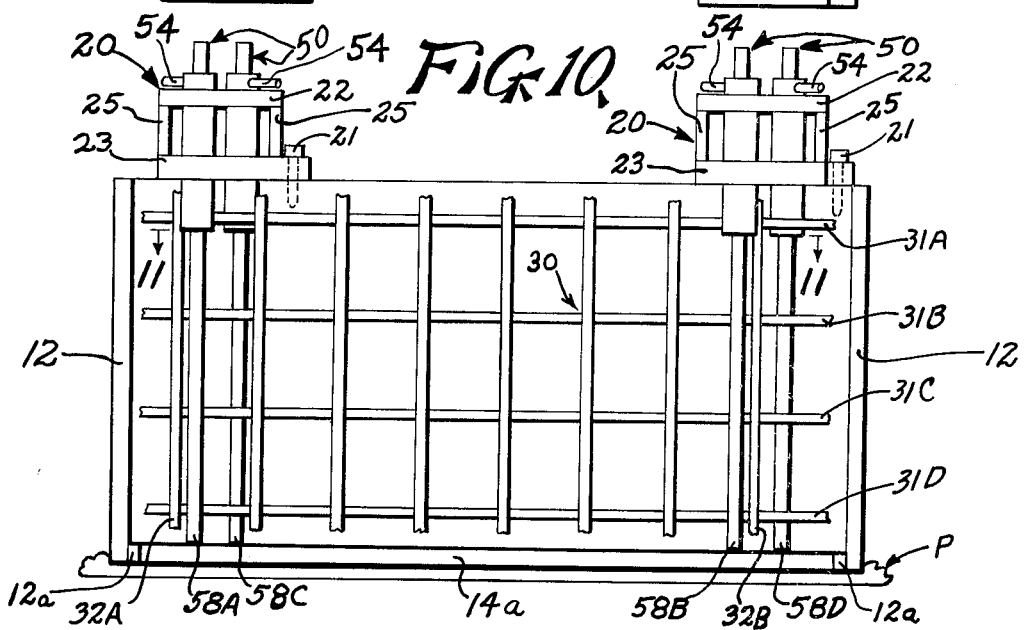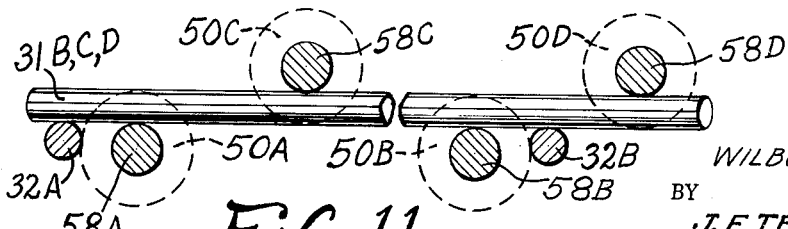

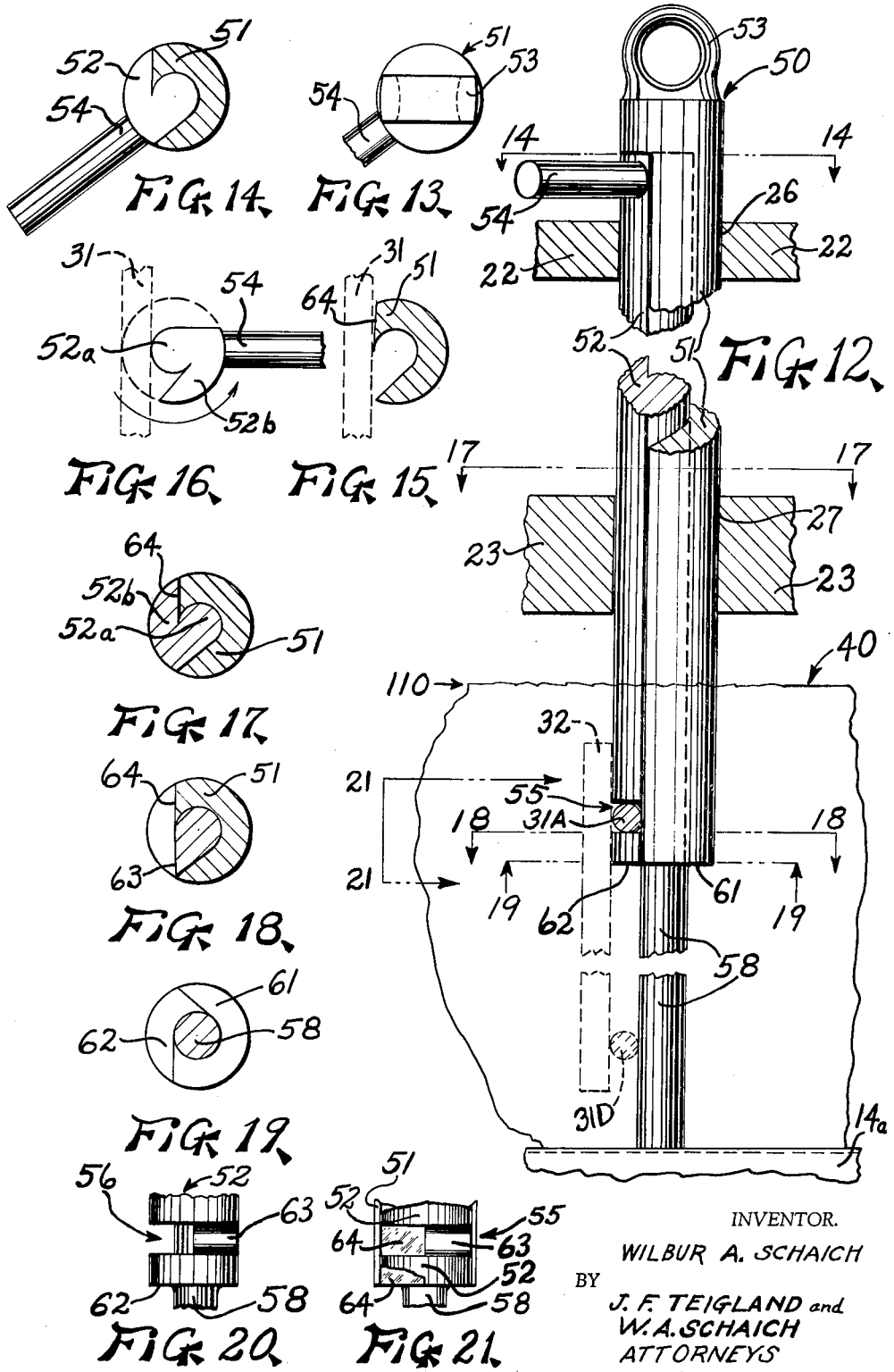

United States Patent Office 3,201,846
Patented Aug. 24, 1965

3,201,846
APPARATUS FOR SUPPORTING A REINFORCING MESH IN A MOLD
Wilbur A. Schaich, Maumee, Ohio, assignor to Owens-Illinois Glass Company, a corporation of Ohio
Filed May 31, 1961, Ser. No. 113,942
1 Claim. (Cl. 25—118)

This invention relates to improved apparatus for supporting a reinforcing mesh in a mold for manufacturing slabs of cementitious material and for providing apertures in the slabs whereby a plurality of slabs may be assembled in side-by-side relationship in erecting building walls or similar structures.

Accordingly, it is an object of this invention to provide an improved apparatus for fabricating cementitious slabs or panels with specially shaped openings extending transversely of the panels and parallel to the width dimension thereof.

A particular object of this invention is to provide an improved apparatus for supporting the reinforcing mesh or wire in a panel mold utilized for the casting of a cementitious slurry, said apparatus being characterized by the employment of mesh-holding members which are operable in one angular position to lock the reinforcing mesh in a desired position in the mold and at a second angular position to be released from the reinforcing mesh, and further characterized by the fact that removal of such mesh-holding members from the formed panel provides the apertures necessary for assembling such panel in a wall.

The specific nature of this invention, as well as other objects and advantages thereof, will become apparent to those skilled in the art from the following detailed description, taken in conjunction with the annexed sheets of drawings, on which:

FIG. 1 is a side elevational view of one of the cementitious panels utilized in the wall of FIG. 2;

FIG. 2 is a vertical sectional view, taken on the line 2—2 of FIG. 1, showing a plurality of cementitious panels disposed in side-by-side relationship;

FIG. 3 is an enlarged scale, partially sectional view of a portion of the wall of FIG. 2;

FIG. 4 is a partial sectional view taken on the line 4—4 of FIG. 3;

FIG. 5 is a sectional view taken on the line 5—5 of FIG. 4, but with the bolt element removed;

FIG. 6 is a side elevational view of the head of the bolt-like member utilized to assemble the wall of FIG. 2;

FIG. 7 is a front elevational view of the bolthead of FIG. 6;

FIG. 8 is a top elevational view of the bolthead of FIG. 6;

FIG. 9 is a top elevational view of a mold structure embodying this invention which may be used for simultaneous casting of a plurality of cementitious slabs or panels utilized in the wall of FIG. 2;

FIG. 10 is a sectional view taken along the plane 10—10 of FIG. 9;

FIG. 11 is a partial sectional view taken on the line 11—11 of FIG. 10;

FIG. 12 is a partial sectional view taken on the line 12—12 of FIG. 9;

FIG. 13 is a top view of mesh-retainer;

FIG. 14 is a cross-sectional view taken on the line 14—14 of FIG. 12;

FIG. 15 is a cross-sectional view of the non-rotating filler element of mesh-retainer shown in relation to horizontal wires of mesh;

FIG. 16 is a top view of rotatable core of mesh-retainer, rotated into position for vertical removal;

FIG. 17 is a cross-section of retainer on line 17—17 of FIG. 12;

FIG. 18 is a cross-section of retainer on line 18—18 of FIG. 12;

FIG. 19 is a cross-section of retainer on line 19—19 of FIG. 12;

FIG. 20 is a partial side elevational view of that portion of the rotating core containing open entry slot and one-half of the wire-receiving groove; and FIG. 21 is a partial side elevational view of FIG. 12 in the vicinity of reinforcing wire, but with wire removed for clarity, showing closured slot as left-hand half of assembled wire-receiving groove.

Referring now in more detail to the drawings, wherein similar reference numerals identify corresponding parts throughout the several views in FIG. 2, the assembly of wall 100 is shown with a two retaining bolt system at the top and a two retaining bolt system at the bottom; however, it is evident that this wall may also be assembled with a minimum of one retaining bolt in the top system and a minimum of one retaining bolt in the bottom system. In assembling wall 100, FIG. 2, panel 40C is bolted against panel 40D by two bolts 80D, placed in the upper holes 70D and 70C of each pair of holes. Before panel 40C is placed in edge-to-edge relationship with panel 40D, a pair of bolts 80C, are inserted, threaded shank in the same direction, in the lower holes 70B and 70A of the panel 40C, FIGS. 1 and 2. Washers 90, FIG. 3, are then slipped over the ends of bolts 80D and nuts 91, are then drawn up on bolts 80D on the lefthand edge of 40C until panel 40C is brought in line with and securely against panel 40D.

Two bolts, 80B, FIG. 2, are then inserted into and through holes 70D and 70C in panel 40B, which is then placed in line with the two protruding bolts 80C. The shank ends of bolts 80C are inserted in their corresponding holes 70B and 70A of panel 40B so that it may be moved against panel 40C. When panel 40B is in close relationship with panel 40C the nuts 91 on bolts 80D are covered by the same recesses 72, FIGS. 2 and 3, that also hold the heads of bolts 80B.

The nuts 92 are then drawn up on bolts 80C to make panel 40B part of the wall 100. The heads of two bolts 80A are then seated in the countersunk end of each lower hole 70B and 70A and panel 40A is ready to push over protruding shank ends of bolts 80B. When panel 40A is pushed up to panel 40B the nuts 93 are drawn up on bolts 80B which completes four panel wall 100 as shown in FIG. 2. The two bolts 80A shown protruding from panel 40A, FIG. 2, are left thus, to demonstrate the appearance of a wall when a fifth panel is to be placed in juxtaposition to the left of panel 40A.

For making a plurality of panels from cementitious slurry, a cubical rectangular mold 10, FIGS. 9 and 10, is used, having two easily removable side walls 11, and two similarly removable end walls 12, all four resting on base 14, composed of spaced hollow tubes 14a which become individual panel bases, whereby the resulting cementitious casting may be easily sliced into separate panels 40, FIGS. 1 and 2. These hollow beams are held in fixed relationship by a system of removable, equally spaced end plugs 12a carried by end walls 12. This base structure rests upon an elastomeric pad P, FIG. 10, which prevents loss of slurry through the spaces 13 of FIG. 9 lying between the hollow beams.

Such mold structure is described and illustrated in the copending application of Richard C. Gasmire, Serial No. 841,339, filed September 21, 1959, now abandoned, assigned to the assignee of this application.

To support a reinforcing mesh 30, FIGS. 9 and 10, in proper position to be incorporated in each of the sliced panels, the following mesh supporting structure is provided:

A plurality of vertically disposed rod-like mesh retainers 50, FIGS. 12–21, are provided, at least two of which cooperate with each reinforcing mesh 30. In the specific embodiment of the invention illustrated in the drawings, FIGS. 9–11, four of such mesh-retainers 50 are provided for each individual mesh 30, two of such mesh-retainers being disposed on one side of the particular mesh 30 and adjacent to the respective ends thereof, and the other two mesh-retainers 50 being disposed on the opposite side of the particular mesh 30 and closely adjacent to the other mesh-retainers. In principle, each mesh-retainer comprises a rod-like element which may be inserted by an axial movement into the mold 10 in a fixed position closely adjacent to the particular mesh 30 and then rotated to effect a locking engagement between the mesh-retainer 50 and one or more of the horizontally disposed mesh wires 31 of the particular mesh 30.

A supporting structure 20, FIGS. 9 and 10, for the mesh-retainers 50 is provided comprising a lower plate member 23, an upper plate member 22 and welded side frame elements 25. A support structure 20 is provided at each end of the mold 10 and is accurately located with respect to the mold cavity by dowel pins 21 which pass through the lower plate 23 and into suitable holes provided in the mold side walls 11. Plates 22 and 23 are respectively provided with a plurality of aligned vertical apertures 26 and 27, FIG. 12, there being a set of such apertures for each mesh-retainer 50.

Each mesh-retainer 50 comprises an elongated, rod-like core element 52 around which a hollow filler element 51 may be assembled after the core 52 is inserted in the mold. The cross-sectional configuration of each core 52 is indicated by the plurality of sectional views, FIGS. 14, 16, and 17–19, respectively, from which it will be observed that one side 52a of each core 52 is of semi-cylindrical configuration throughout the entire length while the other side 52b is radially enlarged at its upper end. The extreme lower portion 58 of each core element 52 is of true cylindrical construction and is proportioned so as to snugly rest against the sides of the lowermost horizontal wires of the reinforcing mesh 30, such as the wires 31B, 31C and 31D of FIG. 10. The core 52 is fully inserted into the mold 10 by insertion through the apertures 26 and 27 of the support structure 20 with the cylindrical side 52a adjacent the mesh 30. In this position, the radially enlarged upper portion 52b of the core 52 will extend at least below the topmost wire 31A of the reinforcing mesh 30. A horizontal slot 56, FIG. 20, provided in such enlarged portion, begins to engage the top wire 31A when the core structure 52 is rotated about its axis after its initial insertion in the mold. This rotation is halted by right-hand half 63, of groove 55, FIGS. 20 and 21, seating flush against said wire.

With the structure thus far described, it is apparent that the supporting mesh 30 may be restricted against vertical displacement and one direction of horizontal displacement by operation of one core element 52 of the mesh-retainer 50. The complete locking of the mesh 30 is achieved by utilizing four of such mesh-retainers 50 disposed as previously indicated, with a pair thereof at each end of the mesh and the elements of each pair being disposed from opposite sides of the mesh 30. However, when the mold 10 is filled with concrete slurry and such slurry permitted to preharden, were the removal of a core shaped like 52 to be attempted, it is apparent that there would be a substantial resistance to its rotation, in order to disengage the grooved portion 63 from the mesh wires 31A, due to the fact that the concrete would have filled in all voids. To minimize this problem, the filler elements 51 are provided which, as illustrated by the various cross-sectional views, FIGS. 14–19, respectively, snugly surround and conform to the core elements 52 so that the combined structure is essentially cylindrical and thus defines the countersunk holes 70A, 70B, 70C or 70D of the finished panels. Thus the filler elements 51 may be withdrawn vertically and each core 52 rotated into the resulting void and also vertically removed.

Each filler element 51 is assembled upon its core 52 after the core 52 has been rotated to the position indicated in FIG. 12 wherein it is in engagement with the horizontal wire 31A of the reinforcing mesh 30. Such assembly is accomplished by axially sliding the filler element 51 around the core structure 52 and downwardly through the aligning apertures 26 and 27 which effect the proper horizontal positioning of the particular mesh-retainer 50. Flat face 64 of part 51, FIG. 21, then closes slot 56, FIG. 20, changing it into left-hand half of groove 55. Since both faces 63 and 64 lie flush against side of wire 31A, neither part 51 nor part 52 can rotate in guides 26 and 27, and when paired with an adjacent, opposing mesh-retainer, one end of said wire is partly locked in place, and is completely locked in place when a similar pair of opposing, adjacent mesh-retainers are set in their guides and their grooves grasp the wire at its free end. After all the mesh-retainers 50 have been locked in assembly with the respective reinforcing meshes 30, the mold 10 is then filled with appropriate concrete slurry which is permitted to harden to a self-supporting consistency.

When this condition is reached, the spacer elements 51 are withdrawn by means of axial motion applied at ring 53, and the core structure 52 of each mesh retainer 50 is rotated counterclockwise, FIG. 16, approximately 135° as by twisting pins 54 provided in the top of each core 52, to bring the narrow side 52a thereof into contiguous relationship with the wires of the mesh 30, whereupon the mesh wire 31A no longer lies in the slot 56, FIGS. 16 and 20, and the core 52 may be axially withdrawn from the mold and from the prehardened concrete with a minimum of effort.

It is, therefore, apparent that the aforedescribed construction permits positioning of the reinforcing mesh 30 within the cavity of mold 10 with a very high degree of accuracy and positively locks each such mesh against accidental displacement that might be caused by the force of the concrete being rapidly poured into such mold. At the same time, the panel fastening apertures 70A . . . 70D are accurately defined in each of the panels.

The resulting cake of partially hardened concrete is exposed by removing the mold side walls 11 and end walls 12, whereupon the cake is sliced lengthwise by well known apparatus to form a plurality of panels 40 each containing an accurately positioned reinforcing mesh 30 and traversed by four assembly holes 70A . . . 70D.

Curing and complete hardening of the panels is then effected, either by air drying or autoclaving and the finished panels are then stripped from the mold base tubes 14a.

From the foregoing it will be apparent that the countersunk portions 72 of holes 70 of the finished panels 40, FIGS. 1–4 and 12 are respectively made by those parts of the cylindrical mesh-retainers 50 which lie below the slurry fill line 110, FIG. 12, of the mold 10.

Shoulder 71, FIG. 5, is formed in the concrete principally by bottom face 61 of part 51, FIGS. 12 and 19, and is completed by bottom face 62 of part 52, FIGS. 12, 19 and 20. Stem portion 58, FIGS. 10 and 12, of the retainer forms the smaller diameter portion 73 of hole 70, FIGS. 1 and 5, which receives the body 87 of bolt 80, FIGS. 6 and 7. In FIG. 11, enlarged portions of the retainers shown as phantoms 50A and 50B may be made to rest against vertical wires 32A and 32B of mesh to hold said mesh even more rigidly in place.

The remaining feature of the complex shoulder system in the hole 70, FIG. 5, is an offset shoulder formed by transverse wire 31A, which was held in this relationship to the rest of the countersunk area by the interlocking action of pairs of grooves 55, FIGS. 12 and 21, in retainer rods 50, as previously described.

Since in this type of wall design the heads of any assembly bolts are made inaccessible by the already closed joint between each two previously mounted panels, it is desirable that an internal control means, at the bolthead area, be provided to prevent the assembly bolts from turning on their central axes in the holes when the nuts are bing drawn tight on the opposite threaded ends, two panel widths beyond. This is accomplished by providing the assembly bolts 80, FIGS. 6–8, with a regular hexagonal head 85, topping an unusual shoulder 86, whose bottom face 83 rests upon contrete shoulder area 71, FIGS. 3–5, of countersunk hole in the foamed panel 40. The curved portion 81 of said bolt partly encircles wire 31A of transverse off-set wire shoulder, FIGS. 3–5, while simultaneously, flat sideface 82 sets flush against the exposed straight line side of said transverse wire shoulder, thus preventing the bolt from turning while the nut on threaded end 89 of bolt 80 is being tightened against washer 90 protecting panel 40.

The countersunk chamber 72 of hole 70, FIGS. 3 and 4, is deep enough so that there is space above the head of the traversing bolt for receiving the threaded shank and the nut and washer of the bolt that holds the previous two panels together. These latter projecting items being thus recessed into the next panel, a flush edge-to-edge panel assembly is provided.

In assembling the panels, since each pair of holes is offset on opposite sides of the transverse wire 31 of reinforcing mesh, the flats 82 of the boltheads 85 are always inserted in the face-to-face relationship shown for the two boltheads depicted in panels 40B and 40C of FIG. 3.

A modification of the above four-hole assembly system would be to use only upper pairs of holes and their alternating bolts while securing the bottom edges of the panels in a channelized or grooved foundation.

Another modification would be the reverse of this latter method in that the channel might be provided adjacent to the ceiling area and the lower pair of holes 70 and their alternating bolts 80 would be used to give rigidity to the wall.

It will, of course, be understood that various other details of construction may also be modified through a wide range without departing from the principles of this invention, and it is, therefore, not the purpose to limit the patent granted hereon, otherwise than necessitated by the scope of the appended claim.

I claim:

A device for providing vertical support for a reinforcing mesh disposed within a mold and designed for extraction when the molded material has set sufficiently to support said mesh, comprising: a core and a collar which telescope together and cooperatively define a lower cylindrical portion and a surmounted upper cylindrical portion, both portions being concentric to a common longitudinal axis, said upper portion having a larger diameter than said lower portion, said upper portion having a transverse notch designed to receive and support a horizontal portion of said mesh, said transverse notch being spaced from said axis a distance at least equal to the radius of said lower portion; said core including said lower cylindrical portion, that portion of said upper portion directly underlying said notch and another portion of said upper cylindrical portion, said another portion extending the length of said upper cylindrical portion; said collar including at least that portion of said upper cylindrical portion which lies below the plane of said notch but does not directly underlie said notch, whereby on removal of said collar from the molded material the core may be rotated from underlying engagement with said mesh into a portion of the void left by said collar to permit withdrawal of said core.

References Cited by the Examiner

UNITED STATES PATENTS

| | | | |
|---|---|---|---|
| 472,189 | 4/92 | Donaldson | 25—128.1 |
| 780,321 | 1/05 | Burkholder et al. | 25—121 |
| 1,183,128 | 5/16 | Sheldon | 25—121 |
| 1,389,803 | 9/21 | Wolfe | 25—118 |
| 1,439,646 | 12/22 | Smith | 25—44 |
| 1,734,771 | 11/29 | Mitchell | 50—132 |
| 2,014,080 | 9/35 | Colt | 25—131 |
| 2,340,263 | 1/44 | Dodson | 50—132 |
| 2,901,807 | 9/59 | Helmerson | 25—118 |
| 2,979,801 | 4/61 | Gasmire | 25—154 |
| 2,989,793 | 6/61 | Jakobsson et al. | 25—118 |
| 3,070,867 | 1/63 | Belle | 25—131 |

FOREIGN PATENTS

| | | |
|---|---|---|
| 865,520 | 2/41 | France. |
| 839,922 | 5/52 | Germany. |
| 291,838 | 6/28 | Great Britain. |

WILLIAM J. STEPHENSON, *Primary Examiner.*

JACOB NACKENOFF, ROBERT F. WHITE, *Examiners.*